UNITED STATES PATENT OFFICE.

CARL JAGERSPACHER AND MAX ISLER, OF BASEL, SWITZERLAND, ASSIGNORS TO SOCIETY OF CHEMICAL INDUSTRY IN BASLE, OF BASEL, SWITZERLAND.

DISAZODYESTUFFS DYEING MORDANTED FIBERS.

1,338,506.  Specification of Letters Patent.  Patented Apr. 27, 1920.

No Drawing.  Application filed August 17, 1918. Serial No. 250,332.

*To all whom it may concern:*

Be it known that we, CARL JAGERSPACHER and MAX ISLER, both citizens of the Swiss Republic, and residents of Basel, Switzerland, have invented new Disazodyestuffs Dyeing Mordanted Fibers, of which the following is a full, clear, and exact specification.

We have found that when the aminoazodyestuffs, obtained by combining the diazoderivatives of aromatic aminocarboxylic acids with aminocarboxylic acids also capable of being diazotized, preferably in form of their N-methylenesulfonic acids, are diazotized again, eventually after the N-methylenesulfogroup has been split off, and the resulting diazobodies combined with an arylpyrazolone compound able to combine with a diazobody, new disazodyestuffs are obtained, which correspond to the formula

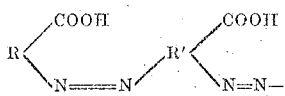

wherein R and R′ are substituted arylradicals which may be substituted and X stands for an arylpyrazolone compound able to be combined with a diazobody.

Particularly valuable are the dyestuffs in which the last component is an arylpyrazolone compound in which the aryl radical is substituted by a carboxyl group or by a carboxyl group and a hydroxylgroup.

The dyestuffs are in a dry state red to brown powders dissolving in water with yellow to red colorations and in concentrated sulfuric acid with blue-red colorations and dyeing wool in an acid bath orange-yellow to yellow-orange tints becoming, on subsequent chromating, fast yellow to brown. The dyestuffs are especially adapted to be fixed on cotton by printing them with chromium mordants, whereby fast yellow to blue prints are obtained.

Example 1.

15.7 parts of anthranilic acid are dissolved in 100 parts of water and 4 parts of sodium hydroxid and condensed with a molecular quantity of a formaldehyde-bisulfite solution derived from 3 parts of formaldehyde and 10.4 parts of sodium bisulfite, by heating for 8 hours at 40 to 50° C. The solution of the N-methylenesulfocompound of anthranilic acid thus obtained is added, in presence of sodium acetate, to the diazocompound prepared in the usual manner from 13.7 parts of metaaminobenzoic acid. After stirring for several days at ice temperature, the diazocompound disappears and an orange yellow dyestuff separates, which can be salted out. The N-methylenesulfogroup is hereafter split off in a known manner, for instance, by boiling the dyestuff for ¼ hour with 500 parts of soda lye of 2 per cent. The resulting 4-amino-azo-benzene-3:3′-dicarboxylic acid is then isolated by acidifying with acetic acid and salting out and constitutes a light-yellow powder, which is dissolved again in 250 parts of water and 8 parts of sodium hydroxid. To the deep orange-yellow solution obtained are added 6.9 parts of sodium nitrite, its diazotation is effected by acidifying suddenly with hydrochloric acid, while ice is added and the resulting diazoazocompound is combined with a solution of 21 parts of 1 (2′-carboxy)-phenyl-3-methyl-5-pyrazolone made alkaline by sodium carbonate. The disazodyestuff thus obtained is salted out and constitutes an orange-red powder dissolving in water to an orange-red solution and in concentrated sulfuric acid to a bluish-red solution. It dyes wool reddish-yellow tints becoming very deeper on subsequent chromating. Printed on cotton with chromium acetate, it yields orange-yellow tints of good fastness.

Example 2.

21.7 parts of 3:5-aminosulfobenzoic acid are diazotized in the usual manner and the resulting diazocompound is combined, in presence of sodium acetate, with the quantity of formaldehydebisulfite compound derived from 13.7 parts of anthranilic acid, indicated in Example 1. The monoazodyestuff thus obtained is separated as described and decomposed by a short boiling with dilute soda lye and the resulting 4-aminoazobenzene-5′-sulfo-3:3′dicarboxylic acid is isolated by acidifying with acetic acid and salting out. The light-yellow product thus obtained is dissolved in 200 parts of water and 8 parts of sodium hydroxid to the resulting solution are added 6.9 parts of sodium nitrite and the diazotation is effected by acidifying suddenly with hydrochloric acid, while cooling with ice. The suspension of the diazoderivative formed is added to a solution of 20.4 parts or 1-phenyl-5-pyrazolone-3-carboxylic acid made alkaline by sodium carbonate. The disazodyestuff formed is isolated by salting out and constitutes a brown-red powder dissolving in water to an orange solution and in concentrated sulfuric acid to a blue-red solution. It dyes wool in an acid bath orange-yellow tints deepening to brown on a subsequent chromating. By printing it on cotton with chromium acetate a reddish-orange is obtained.

*Example 3.*

13.7 parts of metaaminobenzoic acid are diazotized and combined, in presence of sodium acetate, at ice temperature, with the solution of formaldehyde-bisulfite compound derived from 13.7 parts of metaaminobenzoic acid. The separation and saponification are effected as in the foregoing examples. The light-yellow product of reaction, that is to say, the 4-aminoazobenzene-2:3'-dicarboxylic acid is dissolved in 200 parts of water and 8 parts of sodium hydroxid to the solution obtained are added 6.9 parts of sodium nitrite and the diazotation is effected by adding the necessary quantity of hydrochloric acid at ice temperature. The diazo-compound is added to a solution of 31.4 parts of 1 (2'-oxy-3'-carboxy-5'-sulfo)-phenyl-3-methyl-5-pyrazolone made alkaline by sodium carbonate and the disazodyestuff formed is separated by addition of salt. It constitutes a brown-red powder soluble in water to an orange-yellow solution and in concentrated sulfuric acid to a bluish-red solution. It dyes wool reddish-yellow tints becoming considerably greener on subsequent chromating. Printed on cotton with chromium acetate, it gives a very fast pure orange. It corresponds to the formula

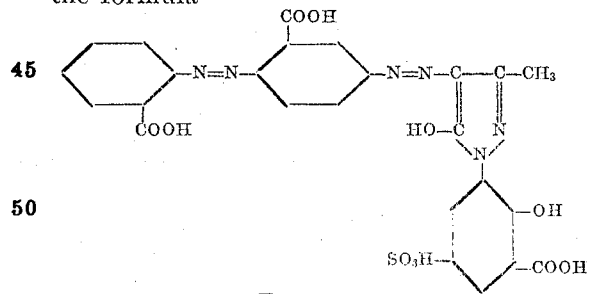

*Example 4.*

There is prepared in the known manner from 13.7 parts of anthranilic acid the N-methylene-sulfocompound which is added to the diazosolution derived from 13.7 parts of paraaminobenzoic acid. The monoazodyestuff formed is separated as described, saponified, isolated, dissolved in the form of its disodium salt, diazotized with 6.9 parts of sodium nitrite and combined with a solution of 31.4 parts of 1 (2'-oxy-3'-carboxy-5'-sulfo)-phenyl-3-methyl-5-pyrazolone made alkaline by sodium carbonate. The disazodyestuff separated by addition of common salt constitutes a red-brown powder dissolving in water with an orange-yellow coloration and in concentrated sulfuric acid with a blue-red coloration. It dyes wool in an acid bath reddish-yellow tints becoming some more brown on subsequent chromating. By printing it on cotton with chromium mordants reddish-orange-yellow tints are obtained.

What we claim is:

1. As new products the herein described disazodyestuffs dyeing mordanted fibers, corresponding to the formula

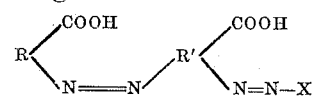

(wherein R and R' stand for aryl radicals which may be substituted and X designs an arylpyrazolone compound able to be combined with a diazobody), constituting in a dry state red to brown powders soluble in water with yellow to violet colorations and in concentrated sulfuric acid with blue-red colorations and dyeing wool in an acid bath orange-yellow to yellow-orange tints, turning, on subsequent chromating, to fast yellow to brown tints and giving, when printed on cotton with chromium mordants, fast yellow to red-orange prints.

2. As a new article of manufacture, the herein described disazodyestuff corresponding to the formula

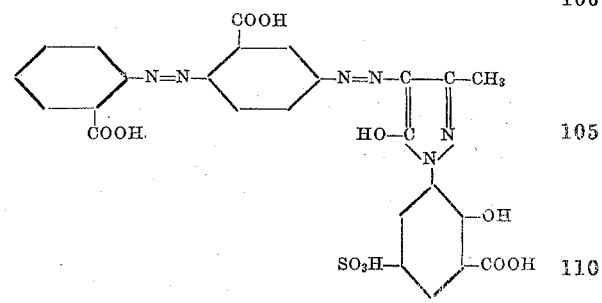

which constitutes, in a dry state, a brown-red powder dissolving in water to orange and in concentrated sulfuric acid to bluish-red solutions, dyes wool, in an acid bath, reddish-yellow tints turning, on subsequent chromating, to a greenish-yellow and furnishes, when printed on cotton with chromium mordants, fast, pure-orange prints.

In witness whereof we have hereunto signed our names this 19th day of July, 1918, in the presence of two subscribing witnesses.

CARL JAGERSPACHER.
MAX ISLER.

Witnesses:
 WALTER E. BUNDY,
 OMAND RITTER.